United States Patent
Zhang et al.

(10) Patent No.: US 9,397,789 B2
(45) Date of Patent: *Jul. 19, 2016

(54) UPLINK RADIO ACCESS NETWORK WITH UPLINK SCHEDULING

(71) Applicant: InterDigital Technology Corporation, Wilmington, DE (US)

(72) Inventors: Guodong Zhang, Syosset, NY (US); Stephen E. Terry, Northport, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/101,538

(22) Filed: Dec. 10, 2013

(65) Prior Publication Data

US 2014/0098768 A1    Apr. 10, 2014

Related U.S. Application Data

(63) Continuation of application No. 11/784,336, filed on Apr. 6, 2007, now abandoned, which is a continuation of application No. 10/939,256, filed on Sep. 10, 2004, now Pat. No. 7,206,581.

(60) Provisional application No. 60/517,779, filed on Nov. 5, 2003.

(51) Int. Cl.
*H04W 36/00* (2009.01)
*H04L 1/08* (2006.01)
(Continued)

(52) U.S. Cl.
CPC .............. *H04L 1/08* (2013.01); *H04L 1/1812* (2013.01); *H04L 1/1829* (2013.01); *H04W 36/02* (2013.01); *H04W 36/18* (2013.01)

(58) Field of Classification Search
CPC ..... H04W 8/245; H04W 36/30; H04W 36/18; H04W 88/14; H04W 88/08; H04W 8/26; H04L 29/06027; H04L 49/25; H04L 29/06; H04L 47/10; H04M 2215/32
USPC ......... 455/405, 418–420, 436, 442, 560, 561; 370/313, 352, 355, 469, 310.2; 709/231, 234
See application file for complete search history.

(56) References Cited

U.S. PATENT DOCUMENTS

| 5,901,354 A | 5/1999 | Menich et al. |
| 5,936,965 A | 8/1999 | Doshi et al. |

(Continued)

FOREIGN PATENT DOCUMENTS

| EP | 1 283 651 | 2/2003 |
| KR | 2001-0083223 | 8/2001 |

(Continued)

OTHER PUBLICATIONS

Lucent Technologies, "HARQ Structure for E-DCH," 3GPP TSG-RAN WG1#33, R1-030773 (Aug. 25-29, 2003).

(Continued)

*Primary Examiner* — Steve D Agosta
(74) *Attorney, Agent, or Firm* — Volpe and Koenig, P.C.

(57) ABSTRACT

A radio access network comprises a serving radio network controller (S-RNC). The S-RNC receives successfully received medium access control (MAC) packet data units (PDUs), discards duplicates of MAC PDUs, reorders the non-discarded MAC PDUs based on serial numbers of the MAC PDUs and delivers the MAC PDUs to a radio link control protocol layer. A controlling radio network controller (C-RNC) provides information to Node-Bs under its control for use in scheduling uplink transmissions. A plurality of Node-Bs schedule uplink transmissions in response to the information provided by its C-RNC, transmit scheduling information to user equipments of its cells, receive MAC PDUs from user equipments of its cells using hybrid automatic repeat request and forward the successfully received MAC PDUs to an associated S-RNC.

7 Claims, 3 Drawing Sheets

(51) Int. Cl.
*H04L 1/18* (2006.01)
*H04W 36/02* (2009.01)
*H04W 36/18* (2009.01)

(56) References Cited

U.S. PATENT DOCUMENTS

| | | | |
|---|---|---|---|
| 6,094,426 | A | 7/2000 | Honkasalo et al. |
| 6,445,910 | B1 | 9/2002 | Oestreich |
| 6,493,342 | B1 | 12/2002 | Breslow et al. |
| 6,678,523 | B1 | 1/2004 | Ghosh et al. |
| 6,757,270 | B1 | 6/2004 | Kumar et al. |
| 6,804,244 | B1 | 10/2004 | Anandakumar et al. |
| 6,862,622 | B2 | 3/2005 | Jorgensen |
| 6,993,342 | B2 | 1/2006 | Kuchibhotla et al. |
| 7,283,508 | B2 | 10/2007 | Choi et al. |
| 7,319,718 | B2 | 1/2008 | Roh et al. |
| 2002/0065064 | A1 | 5/2002 | Griffith et al. |
| 2002/0107971 | A1 | 8/2002 | Bailey et al. |
| 2002/0172208 | A1 | 11/2002 | Malkamaki |
| 2003/0007480 | A1 | 1/2003 | Kim et al. |
| 2003/0031119 | A1 | 2/2003 | Kim et al. |
| 2003/0039270 | A1 | 2/2003 | Chang et al. |
| 2003/0050097 | A1 | 3/2003 | Amirijoo et al. |
| 2003/0128705 | A1 | 7/2003 | Yi et al. |
| 2003/0152031 | A1 | 8/2003 | Toskala et al. |
| 2003/0172114 | A1 | 9/2003 | Leung |
| 2003/0202485 | A1 | 10/2003 | Mansfield |
| 2004/0062248 | A1 | 4/2004 | Nagarajan et al. |
| 2004/0116143 | A1 | 6/2004 | Love et al. |
| 2004/0160925 | A1 | 8/2004 | Heo et al. |
| 2004/0192312 | A1 | 9/2004 | Li et al. |
| 2004/0219917 | A1 | 11/2004 | Love et al. |
| 2004/0219920 | A1 | 11/2004 | Love et al. |
| 2004/0228313 | A1 | 11/2004 | Cheng et al. |
| 2007/0060183 | A1 | 3/2007 | Moulsley et al. |
| 2007/0155388 | A1 | 7/2007 | Petrovic et al. |

FOREIGN PATENT DOCUMENTS

| | | |
|---|---|---|
| KR | 2003-0022490 | 3/2003 |
| WO | 99/09774 | 2/1999 |
| WO | 01/47126 | 6/2001 |
| WO | 02/37872 | 5/2002 |
| WO | 02/47317 | 6/2002 |
| WO | 02/58312 | 6/2002 |
| WO | 2004/102815 | 11/2004 |
| WO | 2005/036894 | 4/2005 |

OTHER PUBLICATIONS

Third Generation Partnership Project 3GPP2 C.20003-C, "Medium Access Control (MAC) Standard for cdma2000 Spread Spectrum Systems", $3^{rd}$ Generation Partnership Project 2 "3GPP2", Version 2.0, Release C, Aug. 2004.
Third Generation Partnership Project 3GPP2 C.S0002-C, "Physical Layer Standard for cdma2000 Spread Spectrum Systems ", $3^{rd}$ Generation Partnership Project 2 "3GPP2", Version 2.0, Revision C, Jul. 23, 2004.
Third Generation Partnership Project 3GPP2 C.S0004-C, "Signaling Link Access Control (LAC) Standard for cdma2000 Spread Spectrum Systems", $3^{rd}$ Generation Partnership Project 2 "GPP2", Version 2.0, Revision C, Jul. 23, 2004.
Third Generation Partnership Project 3GPP2 C.S0005-C, "Upper Layer (Layer 3) Signaling Standard for cdma2000 Spread Spectrum Systems", $3^{rd}$ Generation Partnership Project 2 "3GPP2", Version 2.0, Revision c, Jul. 23, 2004.
Third Generation Partnership Project TR 25.896, "Technical Specification Group Radio Access Network", $3^{rd}$ Generation Partnership Project, Feasibility Study for Enhanced Uplink for UTRA FDD (Release 6), Version 1.0.0 (Sep. 2003).
Third Generation Partnership Project; Technical Specification Group Radio Access Network; High Speed Downlink Packet Access (HSDPA); Overhall description; Stage 2, (Release 5), 3GPP TS 25.308 V.5.4.0 (Mar. 2003).
Third Generation Partnership Project; Technical Specification Group Radio Access Network; High Speed Downlink Packet Access (HSDPA); Overall description; Stage 2, (Release 5), 3GPP TS 25.308 V.5.5.0 (Mar. 2004).
Third Generation Partnership Project; Technical Specification Group Radio Access Network; High Speed Downlink Packet Access (HSDPA); Overall description; Stage 2, (Release 6), 3GPP TS 25.308 V.6.1.0 (Mar. 2004).
Third Generation Partnership Project; Technical Specification Group Radio Access Network; High Speed Downlink Packet Access (HSDPA); Overall description; Stage 2, (Release 6), 3GPP TS 25.307 V.6.2.0 (Sep. 2004).
Third Generation Partnership Project; Technical Specification Group Radio Access Network; 3rd Generation Partnership Project; FDD Enhanced Uplink; Overall description; Stage 2, (Release 6) 3GPP TS 25.309 V. 1.0.0 (Sep. 2004).
Third Generation Partnership Project; Technical Specification Group Radio Access Network; Medium Access Control (MAC) Protocol Specification (Release 1999), 3GPP TS 25.321 V. 3.16.0 (Sep. 2003).
Third Generation Partnership Project; Technical Specification Group Radio Access Network; Medium Access Control (MAC) Protocol Specification (Release 1999), 3GPP TS 25.321 V. 3.17.0 (Jun. 2004).
Third Generation Partnership Project; Technical Specification Group Radio Access Network, Medium Access Control (MAC) Protocol Specification (Release 4), 3GPP TS 25.321 V. 4.9.0 (Sep. 2003).
Third Generation Partnership Project; Technical Specification Group Radio Access Network; Medium Access Control (MAC) Protocol Specification (Release 4), 3GPP TS 25.321 V. 4.10.0 (Jun. 2004).
Third Generation Partnership Project; Technical Specification Group Radio Access Network; Medium Access Control (MAC) Protocol Specification (Release 5), 3GPP TS 25.321, V. 5.6.0 (Sep. 2003).
Third Generation Partnership Project; Technical Specification Group Radio Access Network; Medium Access Control (MAC) Protocol Specification (Release 5), 3GPP TS 25.321 V. 5.9.0 (Jun. 2004).
Third Generation Partnership Project; Technical Specification Group Radio Access Network; Medium Access Control (MAC) Protocol Specification (Release 6), 3GPP TS 25.321, V. 6.2.0 (Jun. 2004).
Third Generation Partnership Project; Technical Specification Group Radio Access Network; Feasibility Study for Enhanced Uplink for UTRA FDD (Release 6), 3GPP TR 25.896 V. 1.0.2 (Oct. 2003).
Third Generation Partnership Project; Technical Specification Group Radio Access Network; Feasibility Study for Enhanced Uplink for UTRA FDD (Release 6), 3GPP TR 25.896 V6.0.0 (Mar. 2004).
Panasonic, "HSUPA MAC architecture," 3GPP TSG-RAN WG2 Meeting #42, R2-040973, Montreal, Canada (May 10-14, 2004).
Qualcomm Europe, "Re-ordering layer termination point," 3GPP TSG-RAN WG2 meeting #42, R2-041007, Montreal, Canada (May 10-14, 2004).

UPLINK RADIO ACCESS NETWORK WITH UPLINK SCHEDULING

CROSS REFERENCE TO RELATED APPLICATIONS

This application is a continuation of U.S. patent application Ser. No. 11/784,336, filed Apr. 6, 2007, which is a continuation of U.S. patent application Ser. No. 10/939,256, filed Sep. 10, 2004, which issued as U.S. Pat. No. 7,206,581 on Apr. 17, 2007, which claims priority from U.S. Provisional Patent Application Ser. No. 60/517,779, filed Nov. 5, 2003, the contents of which are hereby incorporated by reference herein.

FIELD OF THE INVENTION

The present invention relates to the field of wireless communications. More specifically, the present invention relates to processing data blocks in a multi-cell wireless communication system, such as a frequency division duplex (FDD) or time division duplex (TDD) system.

BACKGROUND

Methods for improving uplink coverage, throughput and transmission latency are currently being investigated in third generation partnership project (3GPP) in the context of the Release 6 (R6) universal mobile telecommunications system (UMTS) study item "FDD uplink enhancements".

It is widely anticipated that in order to achieve these goals, Node-B (base station) will take over the responsibility of scheduling and assigning uplink resources (physical channels) to users. The principle is that Node-B can make more efficient decisions and manage uplink radio resources on a short-term basis better than the radio network controller (RNC), even if the RNC retains coarse overall control. A similar approach has already been adopted in the downlink for Release 5 (R5) high speed downlink packet access (HS-DPA) in both UMTS FDD and TDD modes.

It is also envisioned there could be several independent uplink transmissions processed between a wireless transmit/receive unit (WTRU) and a universal terrestrial radio access network (UTRAN) within a common time interval. One example of this would be medium access control (MAC) layer hybrid automatic repeat request (HARQ) or simply MAC layer automatic repeat request (ARQ) operation where each individual transmission may require a different number of retransmissions to be successfully received by UTRAN. To limit the impact on system architecture, it is expected that protocol layers above the MAC should not be affected by introduction of the enhanced uplink dedicated channel (EU-DCH). One requirement that is introduced by this is the in-sequence data delivery to the radio link control (RLC) protocol layer. Therefore, similar to HSDPA operation in the downlink, a UTRAN re-ordering function is needed to organize the received data blocks according to the sequence generated by the WTRU RLC entity.

A soft handover macro-diversity operation requires centralized control of uplink transmissions in each cell within an active set. The active set may include a plurality of Node-Bs. Retransmissions are generated until successful transmission is realized by at least one of the Node-Bs. Successful transmission is not guaranteed at all of the Node-Bs. Therefore, since a complete set of successful transmissions may not be available within any one Node-B, re-ordering of successful transmissions cannot be accomplished.

SUMMARY

A radio access network comprises a serving radio network controller (S-RNC). The S-RNC receives successfully received medium access control (MAC) packet data units (PDUs), discards duplicates of MAC PDUs, reorders the non-discarded MAC PDUs based on serial numbers of the MAC PDUs and delivers the MAC PDUs to a radio link control protocol layer. A controlling radio network controller (C-RNC) provides information to Node-Bs under its control for use in scheduling uplink transmissions. A plurality of Node-Bs schedule uplink transmissions in response to the information provided by its C-RNC, transmit scheduling information to user equipments of its cells, receive MAC PDUs from user equipments of its cells using hybrid automatic repeat request and forward the successfully received MAC PDUs to an associated S-RNC.

BRIEF DESCRIPTION OF THE DRAWING(S)

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENTS

Figure 1:
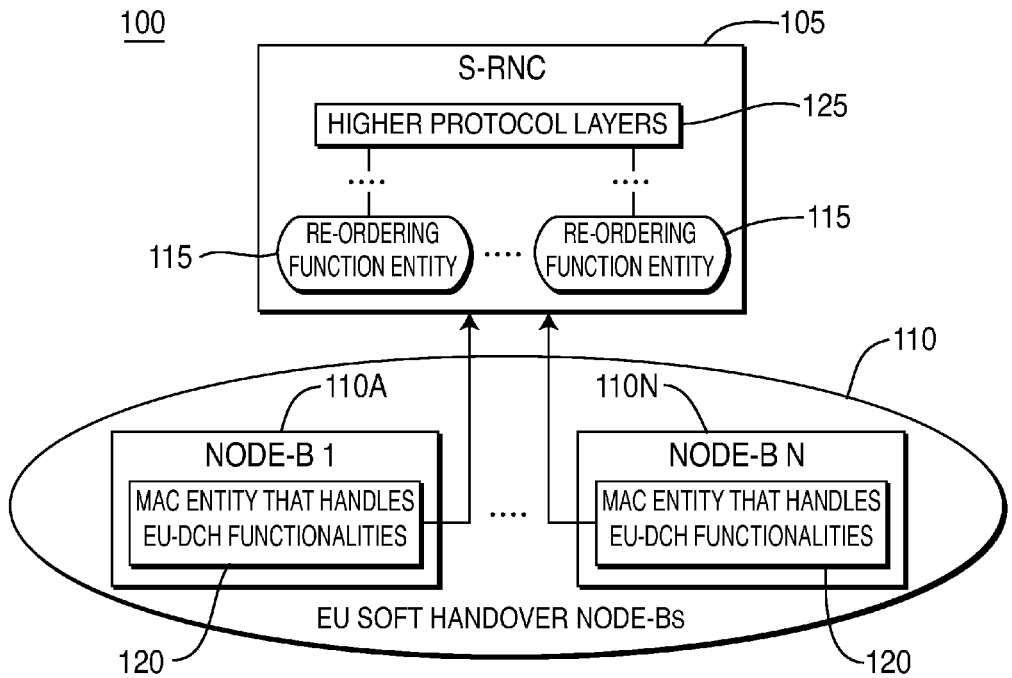
FIG. 1 is a block diagram of a wireless communication system for processing data blocks in a serving-RNC in accordance with a preferred embodiment of the present invention.

The present invention will be described with reference to the drawing figures wherein like numerals represent like elements throughout.

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "base station" includes but is not limited to a Node-B, a site controller, an access point or any other type of interfacing device in a wireless environment.

The present invention may be further applicable to TDD, FDD, and time division synchronous code division multiple access (TD-SCDMA), as applied to UMTS, CDMA 2000 and CDMA in general, but is envisaged to be applicable to other wireless systems as well. With respect to CDMA2000, the present invention may be implemented in EV-DO (i.e., data only) and EV-DV (i.e., data and voice).

The features of the present invention may be incorporated into an IC or be configured in a circuit comprising a multitude of interconnecting components.

During soft handover, higher layers maintain an active subset of EU cells for which EU-DCHs are maintained in a soft handover macro diversity state. Those cells in the active subset may be controlled by different EU-SHO Node-Bs.

FIG. 1 shows a wireless communication system 100 including an S-RNC 105 and at least two (2) EU-SHO Node-Bs 110 (110A . . . 110N) operating in accordance with a preferred embodiment of the present invention. One or more re-ordering function entities 115 are implemented at the S-RNC 105 for each WTRU with and without soft handover. The HARQ or ARQ processes for handling EU-DCH functionalities are located in a MAC entity 120 located within each respective EU-SHO Node-B 110. Each re-ordering function entity 115 communicates with higher protocol layers 125 within the S-RNC 105 and includes an associated data buffer (not shown).

Figure 2:
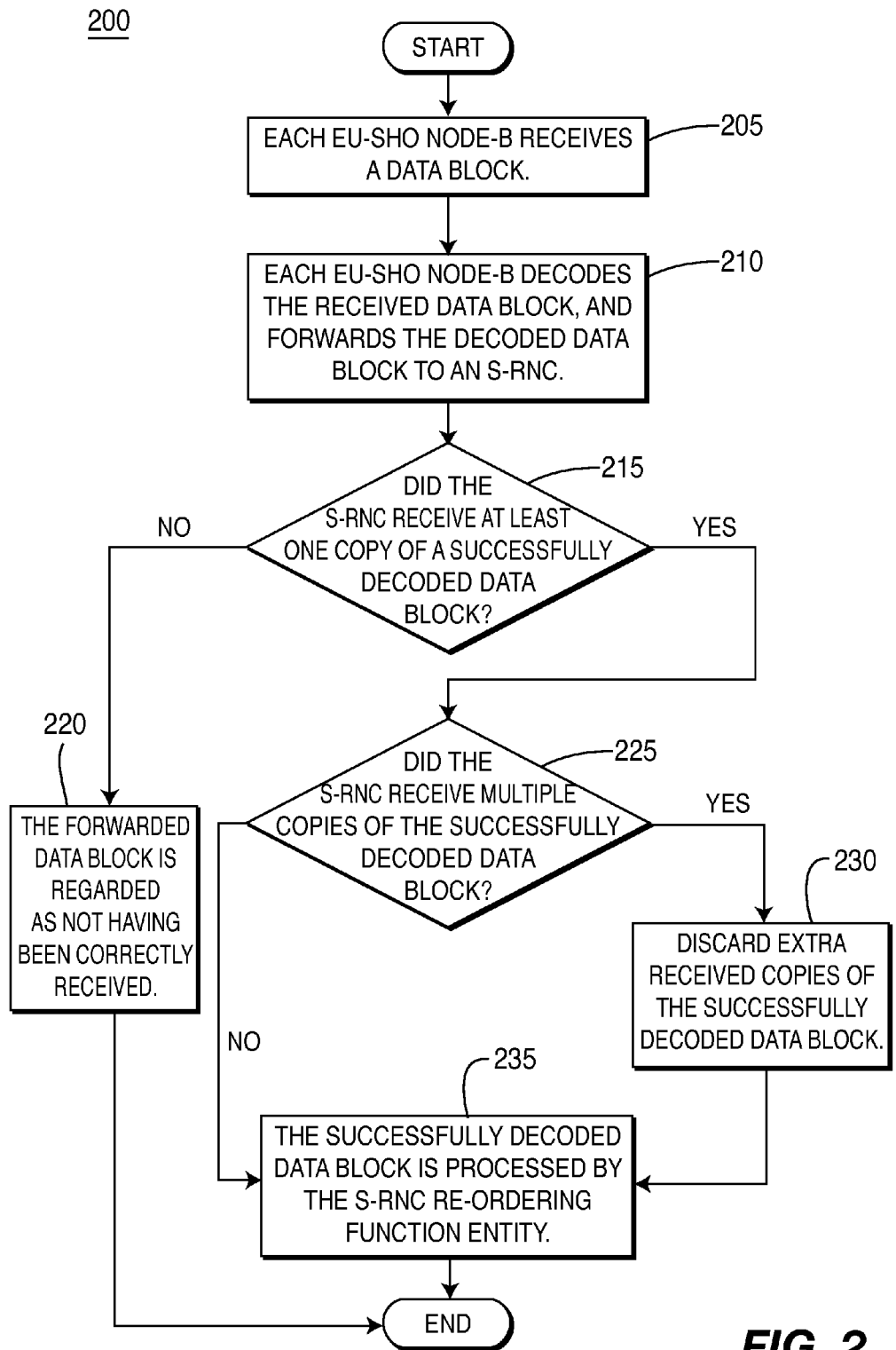
FIG. 2 is a flowchart of a process including method steps for processing data blocks in the system of FIG. 1.

FIG. 2 is a flowchart of a process 200 including method steps for processing data blocks, i.e., packet data units (PDUs), in the system 100 during a soft handover. In step 205, a data block, (i.e., an EU data block), is received at each EU-SHO Node-B 110 from a WTRU. In step 210, each EU-SHO Node-B 110 decodes the received data block, and the decoded data block is forwarded to the S-RNC 105. It should be noted that each EU-SHO Node-B 110 will attempt to decode received EU transmissions. When there is a CRC error, the EU-SHO Node-B 110 cannot forward the received data block to the S-RNC 105, unless the identity of the WTRU and logical channel/MAC-d flow is known by other means. All successfully decoded blocks with good CRC check results are forwarded to the S-RNC 105.

Still referring to FIG. 2, a determination is made as to whether or not at least one copy of a successfully decoded data block is received by the S-RNC 105 from an EU-SHO Node-B 110 (step 215). If it is determined in step 215 that the S-RNC 105 has not received any copy of a successfully decoded data block, the forwarded data block is regarded as not having been correctly received (step 220). If, in step 215, it is determined that at least one copy of a successfully decoded data block has been received by the S-RNC 105 from an EU-SHO Node-B 110, a determination is then made as to whether or not multiple copies of the successfully decoded data block are received from different EU-SHO Node-Bs 110 (step 225).

If step 225 determines that multiple copies of the successfully decoded data block are received from different EU-SHO Node-Bs 110, only one copy will be stored in a re-ordering buffer (not shown) maintained by a re-ordering function entity 115 in the S-RNC 105 as a correctly received data block, and any extra received copies of the successfully decoded data block are discarded as redundant data (step 230).

Finally, in step 235, the successfully decoded data block is processed by the re-ordering function entity 115 in the S-RNC 105. The re-ordering function entity 115 in the S-RNC 105 performs a re-ordering procedure on those successfully decoded data blocks that are correctly received in the re-ordering function entity 115 so as to support in-sequence delivery to the higher protocol layers 125.

Process 200 is beneficial because data blocks received from different EU-SHO Node-Bs 110 can be combined and organized in-sequence for delivery to the higher protocol layers 125 of the S-RNC 105. The re-ordering function entity 115 located within the S-RNC 105 allows enhanced uplink MAC PDU's to be processed for successful reception and proper delivery to higher layers independent of which Node-B(s) that provided reception of each PDU, resulting in the reduction of loss of MAC data and RLC recoveries.

Figure 3:
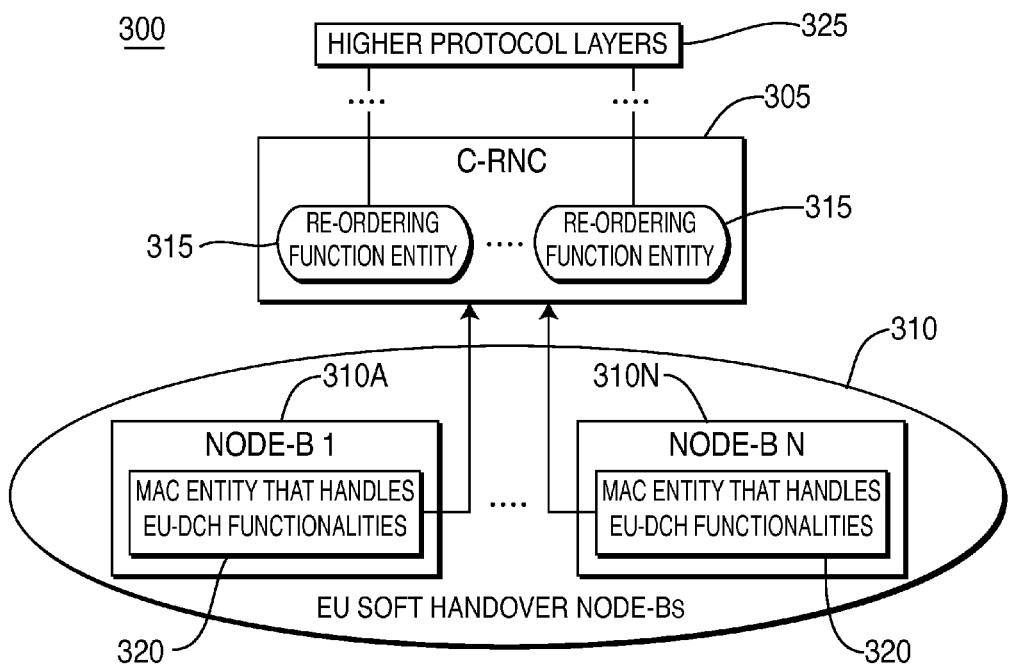
FIG. 3 is a block diagram of a wireless communication system for processing data blocks in a controlling-RNC in accordance with an alternate embodiment of the present invention.

FIG. 3 shows a wireless communication system 300 including a C-RNC 305 and at least two (2) EU-SHO Node-Bs 110 (110A . . . 110N) operating in accordance with an alternate embodiment of the present invention. One or more re-ordering function entities 315 are implemented at the C-RNC 305 for support of soft handover. The HARQ or ARQ processes for handling EU-DCH functionalities are located in a MAC entity 320 located within each respective EU-SHO Node-B 310. Each re-ordering function entity 315 communicates with higher protocol layers 325 external to the C-RNC 305 and includes an associated buffer (not shown).

Figure 4:
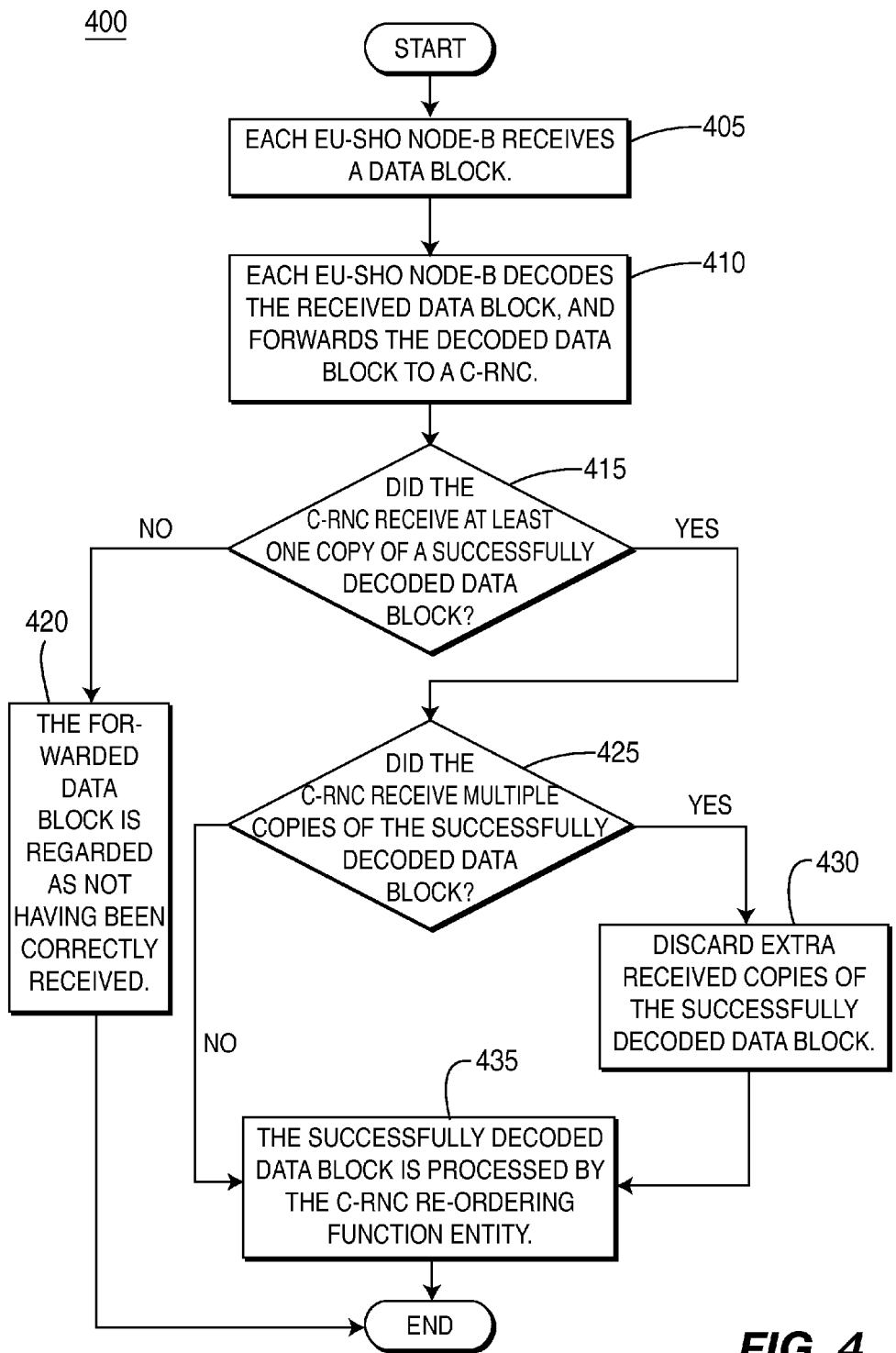
FIG. 4 is a flowchart of a process including method steps for processing data blocks in the system of FIG. 3.

FIG. 4 is a flowchart of a process 400 including method steps for processing data blocks, i.e., PDUs, in the system 300 during a soft handover. In step 405, a data block (i.e., an EU data block) is received at each EU-SHO Node-B 310 from a WTRU. In step 410, each EU-SHO Node-B 310 decodes the received data block, and the decoded data block is forwarded to the C-RNC 305. It should be noted that each EU-SHO Node-B 310 will attempt to decode received EU transmissions. When there is a CRC error, the EU-SHO Node-B 310 cannot forward the received data block to the C-RNC 305, unless the identity of the WTRU and logical channel/MAC-d flow is known by other means. All successfully decoded blocks with good CRC check results are forwarded to the C-RNC 305.

Still referring to FIG. 4, a determination is made as to whether or not at least one copy of a successfully decoded data block is received by the C-RNC 305 from an EU-SHO Node-B 310 (step 415). If it is determined in step 415 that the C-RNC 305 has not received any copy of a successfully decoded data block, the decoded data block forwarded by the EU-SHO Node-Bs 310 is regarded as not having been correctly received (step 420).

If, in step 415, it is determined that at least one copy of a successfully decoded data block has been received by the C-RNC 305 from an EU-SHO Node-B 310, a determination is then made as to whether or not multiple copies of the successfully decoded data block are received from different EU-SHO Node-Bs 110 (step 425).

If step 425 determines that multiple copies of the successfully decoded data block are received from different EU-SHO Node-Bs 310, only one copy will be stored in a re-ordering buffer (not shown) maintained by a re-ordering function entity 315 in the C-RNC 305 as a correctly received data block, and any extra received copies of the successfully decoded data block are discarded as redundant data (step 430).

Finally, in step 435, the successfully decoded data block is processed by the re-ordering function entity 315 in the C-RNC 305, which performs a re-ordering procedure on those successfully decoded data blocks that are correctly received in the re-ordering function entity 315 so as to support in-sequence delivery to the higher protocol layers 325.

Process 400 is beneficial because data blocks received from different EU-SHO Node-Bs 310 can be combined and organized in sequence for delivery to the higher protocol layers 325, provided that these Node-Bs 310 have the same C-RNC 305. This is frequently the case, although its applicability is somewhat more restrictive than placing a re-ordering function in an S-RNC 105. However, this restriction is offset by other considerations. For example, a benefit of C-RNC operation is reduced latency for H-ARQ operation. The performance benefits of minimizing this latency are well understood in the art. During soft handover, it is also desirable to have a common uplink scheduler in the C-RNC 305 for all of the cells that are in the active EU subset, including cells that are controlled by different Node-Bs 310.

While this invention has been particularly shown and described with reference to preferred embodiments, it will be understood by those skilled in the art that various changes in form and details may be made therein without departing from the scope of the invention described hereinabove.

What is claimed is:

1. A third generation partnership project (3GPP) frequency division duplex (FDD) wireless communication system comprising:
   a plurality of Node-Bs, wherein the Node-Bs are in an active set, each Node-B including:
   a receiver configured to receive medium access control (MAC) packet data units (PDUs) from a wireless transmit/receive unit (WTRU) over one or more enhanced uplink (EU) channels, wherein the MAC PDUs are received using hybrid automatic repeat request (HARQ) protocol and each of the MAC PDUs is retransmitted from the WTRU until the MAC PDU is successfully received by at least one of the Node-Bs in the active set;
   a scheduler configured to schedule EU transmissions from the WTRU; and
   a transmitter configured to send successfully received MAC PDUs to a radio network controller (RNC); and
   the RNC including:
   a reordering function entity configured to receive MAC PDUs from each of the plurality of Node-Bs in the active set that successfully decodes the MAC PDUs, discard duplicate copies of the MAC PDUs that are received from two or more Node-Bs, reorder the MAC PDUs to be in-sequence in an associated buffer based on serial numbers of the MAC PDUs such that the in-sequence MAC PDUs include the successfully received MAC-PDUs from the two or more Node-Bs of the active set and only a single copy of a MAC PDU is stored in the associated re-ordering buffer, and deliver the reordered MAC PDUs to a radio link control (RLC) protocol layer, wherein the MAC PDUs are received at each of the plurality of Node-Bs over one or more EU channels; and
   a common uplink scheduler configured to coordinate EU scheduling between the plurality of Node-Bs of the active set.

2. The system of claim 1 wherein the RNC is a serving RNC (SRNC).

3. The system of claim 1 wherein the RNC is a controlling RNC (CRNC).

4. A method for use in a third generation partnership project (3GPP) frequency division duplex (FDD) wireless communication system comprising:
   receiving, at a plurality of Node-Bs, medium access control (MAC) packet data units (PDUs) from a wireless transmit/receive unit (WTRU) over one or more enhanced uplink (EU) channels, wherein the MAC PDUs are received using hybrid automatic repeat request (HARQ) protocol and each of the MAC PDUs is retransmitted from the WTRU until the MAC PDU is successfully received by at least one of the Node-Bs in the active set;
   scheduling, at the plurality of Node-Bs, EU transmissions from the WTRU; and
   transmitting, from the plurality of Node-Bs, successfully received MAC PDUs to a radio network controller (RNC);
   receiving, at the RNC, MAC PDUs from each of the plurality of Node-Bs that successfully decodes the MAC PDUs;
   discarding, at the RNC, duplicate copies of the MAC PDUs that are received from two or more Node-Bs;
   reordering, at the RNC, the MAC PDUs to be in-sequence in an associated buffer based on serial numbers of the MAC PDUs such that the in-sequence MAC PDUs include the successfully received MAC-PDUs from the two or more Node-Bs and only a single copy of a MAC PDU is stored in the associated re-ordering buffer;
   delivering, at the RNC, the reordered MAC PDUs to a radio link control (RLC) protocol layer, wherein the MAC PDUs are received at each of the plurality of Node-Bs over one or more EU channels; and
   coordinating, at the RNC, EU scheduling between the plurality of Node-Bs.

5. The method of claim 4 wherein the Node-Bs are in an active set.

6. The method of claim 4 wherein the RNC is a serving RNC (SRNC).

7. The method of claim 4 wherein the RNC is a controlling RNC (CRNC).

* * * * *